Jan. 2, 1934.        J. R. HERSHEY        1,941,939
NUT HUSKING MACHINE
Filed July 9, 1932
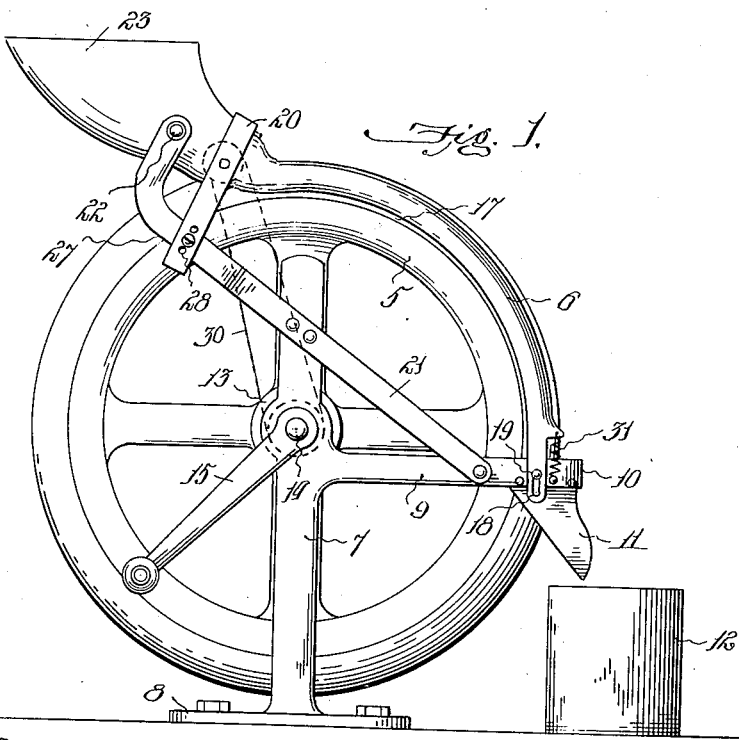
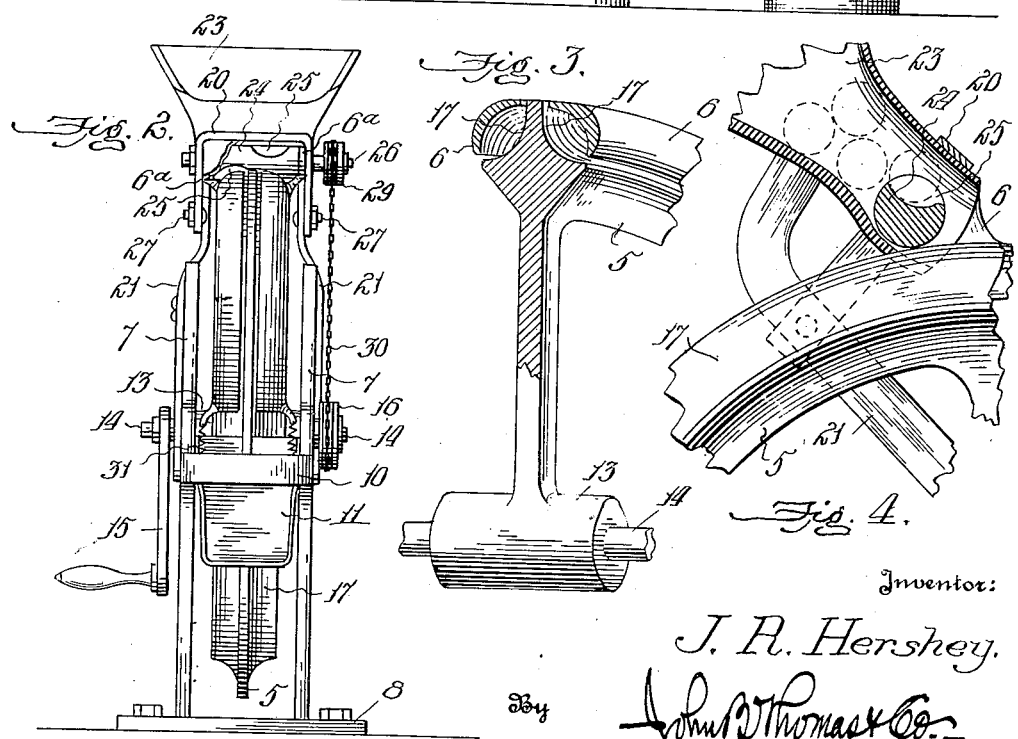
Inventor:
J. R. Hershey.
By John D. Thomas & Co.
Attorneys.

Patented Jan. 2, 1934

1,941,939

UNITED STATES PATENT OFFICE 1,941,939

NUT HUSKING MACHINE

Jacob R. Hershey, Kinzers, Pa.

Application July 9, 1932. Serial No. 621,711

8 Claims. (Cl. 146—11)

My invention is an improvement in machines for removing hulls or husks from nuts of different kinds, and relates more especially to that type of machine employing a cylinder or wheel and concaves between which the nuts pass and are subjected to a rubbing action.

The primary object of my invention is to provide a simple and compact machine of this general type in which the concaves cooperating with the revolving wheel are under tension so as to accommodate themselves to any variation in the size of the nuts operated upon, and to provide for adjusting the concaves with respect to the wheel or cylinder for operating on nuts of different kinds and sizes, as for instance walnuts, pecans, hazelnuts, etc.

A further object of my invention is to provide a nut hulling machine with opposed rubbing surfaces arranged in pairs for the passage of the nuts between each pair, in combination with mechanism for feeding nuts between the pairs of rubbing surfaces, all as hereinafter fully described and specifically pointed out in the appended claims.

In the accompanying drawing:

Figure 1 is a side elevation of a nut hulling machine constructed in accordance with my invention.

Fig. 2 is an end elevation.

Fig. 3 is an enlarged view showing a fragment of the wheel and concaves, and

Fig. 4 is a perspective view to illustrate the mechanism for feeding the nuts from the hopper into the spaces between the wheel and concaves.

In carrying out my invention the main wheel 5, which cooperates with the segmental concaves or rub-irons 6, 6, is mounted between standards or uprights 7, 7, of the supporting frame comprising in addition to said uprights a base or foot piece 8 and forwardly projecting arms 9, 9, connected at their outer ends by a crosspiece 10 formed integrally with said arms, which latter provide for supporting the lower ends of the concaves and a spout 11 from which the hulled nuts are discharged into a receptacle 12. The hub 13 of the wheel 5 is confined between the uprights 7 and is keyed to a shaft 14 having bearings in said uprights, said shaft projecting beyond the latter to receive a crank handle 15 and sprocket wheel 16 at opposite sides of the supporting frame, the sprocket wheel being adapted to operate the feeding mechanism hereinafter described.

In the present instance the periphery of the wheel 5 is formed with concavities 17 at opposite sides thereof roughened as indicated in Fig. 3 to oppose the roughened inner surface of the segmental concaves or rub-irons 6, the lower ends of the latter being slotted, as at 18, to have a yielding movement on the pins 19, 19, projecting from the arms 9 while the upper ends of said segmental concaves are supported by a metal strap 20 adjustably secured to arms 21, 21, at opposite sides of the machine riveted to the upper ends of the standards 7, 7, and extended to form braces for the horizontal supporting arms to which the discharge spout and lower ends of the concaves are attached as hereinbefore stated. The upper ends of the arms 21 are extended beyond the metal strap and are pivotally connected by bolts 22 to a hopper 23 into which the nuts with the hulls thereon are placed and fed or directed to the spaces between the wheel and opposite concaves by a roller 24 having recesses 25 on a line with said spaces, it being noted by reference to Fig. 2 that the upper ends of the concaves are provided with extensions 6a for connection to the shaft 26 to which the aforementioned roller 24 is fixed, and that as the concaves, roller and hopper are all supported by the metal strap 20 adjustment of the latter will regulate the spaces between the concaves and wheel to operate on nuts of different sizes, and for this purpose the outer ends of the strap connected to the arms 21 by bolts 27 are provided with several holes 28 to receive the said bolts. The roller having the feeding recesses 25 is revolved by means of a sprocket wheel 29 on the outer end of the shaft 26 connected by chain 30 to the sprocket wheel on the shaft 14 supporting the main wheel and operated by the crank, and in order that the lower portions of the segmental rub-irons or concaves which cooperate with the concavities in the periphery of the wheel may act on the nuts under spring pressure a spring 31 is connected at one end to each concave and at the other to the arm 9 of the supporting frame, it being understood of course that the springs exert the proper tension on the concaves to insure their desired action in removing the husks, the turning of the wheel carrying the nuts around beneath the concaves and causing a revolving movement of the nuts during the operation of scraping or rubbing off the hulls or husks.

In the operation of the machine the nuts with the husks thereon are dropped into the hopper 23 to collect at the lower end thereof against the feeding roller 24, and as the machine is operated by the turning of crank 15 the nuts in the hopper are received into the openings 25 so that as the roller is turned by the sprocket chain 30 the nuts will be fed into the spaces between the periphery of the wheel 5 and contiguous concaves 6 one at a time alternately. As the wheel turns it will carry the nuts around so that a rubbing action will be imparted thereto by the roughened surfaces of both the concavities in the periphery of the wheel and the concaved inner surfaces of the rubbing irons or concaves 6, the removed bits of husk passing out between the concaves and periphery or rim of the wheel while the cleaned nuts pass into the spout 11 and are discharged therefrom. It will be understood of course that the upper or receiving end of each space between the rim of the wheel and concaves is larger than the space between the lower portions of the concaves and rim of the wheel, or converges from one end to the other, and that the tension of the springs 31 serve to exert a tension on the concaves to increase the rubbing action. When the machine is used for operating on large nuts, as walnuts, the metal strap is adjusted so that the bolts 27 connecting said strap to the arms 21 will pass through the lower holes 28, and for operating on small nuts, as hazelnuts, the bolts are passed through the upper holes in the legs of the strap, thereby positioning the upper ends of the concaves in relation to the rim of the wheel according to the size of the nuts to be operated on. As will be obvious the machine provides for hulling or husking nuts by a continuous operation, it being necessary only to turn the crank and keep a supply of nuts in the hopper.

I claim:

1. A nut husking machine comprising a wheel rotatable in a supporting frame and having a rim with concavities inclined downwardly at opposite sides of the center thereof, rub-irons or concaves supported in spaced relation to said concavities for the passage of the nuts therebetween and spaced from the side edges of the rim for discharging the husks, the nuts being discharged at the lower ends of the rub-irons, and means for exerting tension on the lower ends of the rub-irons.

2. A nut husking machine comprising a wheel rotatable in a supporting frame and having a rim with inclined concavities in the opposite sides thereof, rub-irons or concaves spaced from said concavities for the passage of the nuts to be husked and spaced from the side edge of the rim to discharge the husks, the nuts being discharged at the lower ends of the rub-irons, and means for supporting the rub-irons with relation to the rim of the wheel; together with a hopper for feeding the nuts into the spaces between the concavities and rub-irons.

3. A nut husking machine comprising a wheel rotatable in a supporting frame and having a rim with concavities inclined downwardly at opposite sides of the center thereof, rub-irons or concaves extending partially around the rim at the upper portion thereof, said rub-irons being spaced from said concavities for the passage of the nuts to be husked and spaced from the edge of the rim to discharge the husks, and means for supporting the rub-irons with relation to the rim of the wheel; together with a hopper discharging into the spaces between the rub-irons and concavities, a roller at the discharge end of the hopper having recesses for feeding the nuts one at a time into the opposite concavities, and gearing for operating said roller from the axle of the wheel.

4. A nut husking machine comprising a wheel rotatable in a supporting frame and having concavities in the opposite sides of the periphery thereof, rub-irons or concaves extending partially around the wheel and spaced from said concavities respectively, a hopper for feeding the nuts into the spaces between the rub-irons and concavities, and a metal strap adjustable on the frame of the machine and to which the hopper and upper ends of the rub-irons are connected.

5. A nut husking machine comprising a wheel rotatable in a supporting frame and having concavities in the opposite sides of the periphery thereof, rub-irons or concaves extending partially around the wheel and spaced from said concavities respectively, a hopper for feeding the nuts into the spaces between the rub-irons and concavities, a metal strap adjustable on the frame of the machine and to which the hopper and upper ends of the rub-irons are connected, and means for connecting the lower ends of each rub-iron yieldingly to the supporting frame consisting of a pin projecting from the frame and a slot in a projecting portion of the rub-iron.

6. A nut husking machine comprising a wheel rotatable in a supporting frame and having concavities in the opposite sides of the periphery thereof, rub-irons or concaves spaced from said concavities, a hopper for feeding the nuts into the spaces between the rub-irons and concavities in the periphery of the wheel, a metal strap adjustable on the frame of the machine and to which the rub-irons and hopper are connected, and springs connected to the lower ends of the rub-irons and to the frame of the machine for exerting a tension on the rub-irons.

7. A nut husking machine comprising a wheel rotatable in a supporting frame and having concavities in the opposite sides of the periphery thereof, rub-irons or concaves spaced from said concavities, a hopper and recessed roller at the lower end thereof for feeding the nuts into the spaces between the rub-irons and periphery of the wheel, and a metal strap adjustable on the supporting frame of the machine to support the upper ends of the rub-irons with respect to the wheel; together with springs connected to the lower ends of the rub-irons and to the frame of the machine for exerting spring tension on said rub-irons.

8. A nut husking machine comprising a supporting frame having uprights with arms projecting horizontally therefrom and connected at their outer ends, a wheel mounted in the supporting frame on a shaft having a crank handle at one end and a sprocket wheel at the other end, said wheel having concavities in the opposite sides of the periphery thereof, rub-irons or concaves spaced from said concavities, a metal strap adjustably secured to the frame and supporting the rub-irons at the upper ends thereof, a hopper connected to said metal strap and having a feed roller at the lower end thereof with a sprocket wheel for operating said roller, and a sprocket chain connecting the sprocket wheel of the roller to the sprocket wheel on the shaft of the main wheel; together with springs connected to the lower ends of the rub-irons and to the aforementioned horizontal arms of the supporting frame for exerting spring tension on said rub-irons, and a spout attached to said arms of the supporting frame to receive the hulled nuts and discharge them into a receptacle.

JACOB R. HERSHEY.